United States Patent [19]

Ozawa

[11] Patent Number: 4,742,237
[45] Date of Patent: May 3, 1988

[54] SURFACE CONFIGURATION INSPECTION APPARATUS WITH MOVING GRATING

[75] Inventor: Kenji Ozawa, Kanagawa, Japan

[73] Assignee: Fuji Photo Film Co., Ltd., Kanagawa, Japan

[21] Appl. No.: 37,502

[22] Filed: Apr. 13, 1987

[30] Foreign Application Priority Data

Apr. 11, 1986 [JP] Japan .................................. 61-82225

[51] Int. Cl.⁴ ............................................ G01N 21/86
[52] U.S. Cl. .................................... 250/560; 356/376
[58] Field of Search .................. 250/560, 561, 237 G; 356/376, 381, 382, 391, 392, 371

[56] References Cited

U.S. PATENT DOCUMENTS 4,520,388  5/1985  Kellie .................................. 356/376
4,585,947  4/1986  Liptay-Wagner et al. ......... 250/560

Primary Examiner—David C. Nelms
Attorney, Agent, or Firm—Young & Thompson

[57] ABSTRACT

A surface configuration inspection apparatus comprising a movable member having a grating with parallel equidistant dark and light lines on a transparent plate, and a driving device for causing the vertical movement of the movable member. A projection device projects an image of the grating onto a screen disposed by the object to be inspected. A detector detects the image of the grating on the screen by reflection from a reflective surface on the object to be inspected and displays a deformed pattern of the grating. The deformed pattern changes with the movement of the grating. According to the deformation and the change of the deformation, defects such as projections, depressions, scratches or the like can be identified as to their size and shape.

8 Claims, 2 Drawing Sheets

SURFACE CONFIGURATION INSPECTION APPARATUS WITH MOVING GRATING

BACKGROUND OF THE INVENTION

The present invention relates to a surface configuration inspection apparatus for inspecting a surface of an object for defects.

One of the surface configuration inspection methods well known in the art is that described in "Optical Techniques Handbook" published by Asakura-Shobo Co., Ltd., 1979, at pages 905 and 906, wherein it is proposed that the surface of an object to be inspected be illuminated by a suitable light source from a thin slit and that the reflected light be projected on a screen so as to enable the surface configuration of the object to be inspected. This method requires a high-efficiency and highly aberration-corrected projection lens for projecting a thin accurate slit image onto the surface to be inspected, which is very expensive.

In order to solve this problem, Japanese Patent Kokai (Unexamined Publication) No. 60-63949 teaches a surface defect inspection method in which an image of an inspection grating with parallel equidistant dark and light lines is reflected by a moving object and is picked up by an image pick-up device, thereby permitting defects such as projections and depressions formed on the surface of the moving object to be detected.

According to this surface defect inspection method, since the image of the grating is deformed by the defects of the surface, the configuration of the defects can be distinguished based on the deformation of the grating. However, because the inspection grating has dark and light lines arranged at regular intervals thereon, it is essential, in order to inspect the whole surface of the object, to move the object in a direction perpendicular to the dark and light lines. This means that this surface defect inspection method cannot be used for objects which cannot be moved.

OBJECT OF THE INVENTION

Accordingly, an object of the present invention is to provide a surface configuration inspection apparatus which can inspect a reflective surface of a stationary object.

SUMMARY OF THE INVENTION

According to one aspect of the present invention, there is provided a surface configuration inspection apparatus comprising: a grating which is a transparent plate with parallel equidistant dark and light lines of the same width; means for moving the grating plate; means for projecting an image of the grating onto a screen; and means for observing the reflection of the grating image on the screen by reflection from the surface of the object being inspected, the observing means including an image pick-up device and an image display device. The surface configuration inspection apparatus of this invention inspects defects such as unevenness, projections, depressions, scratches or the like of a size as small as about 3 μm.

According to another aspect of the present invention, the grating comprises a number of parallel equidistant dark lines on a transparent plate, the dark lines being oblique with respect to the direction in which the grating plate is moved. The oblique dark lines to be reflected by the surface of the object are oblique to directions in which defects such as unevenness, projections, depressions, scratches or the like often appear. The surface configuration inspection apparatus can detect defects with a high percentage of success.

BRIEF DESCRIPTION OF THE DRAWINGS

The above and other objects and features of the present invention will become apparent from the following description taken in conjunction with the preferred embodiment thereof with reference to the accompanying drawings, in which.

DETAILED DESCRIPTION OF THE INVENTION

Figure 1:
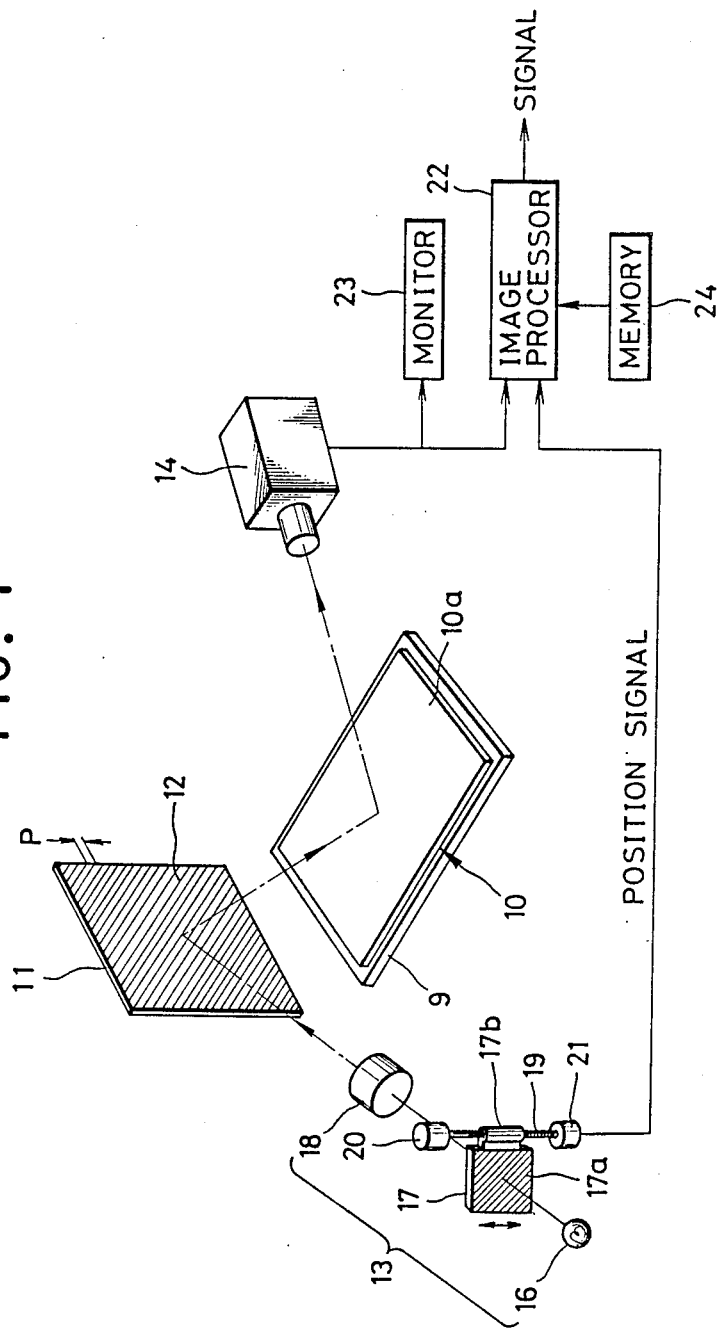
FIG. 1 illustrates schematically a surface configuration inspection apparatus in an embodiment according to the present invention.

Referring to FIG. 1, shown therein is a surface configuration inspection apparatus according to the present invention for inspecting a plate-like object 10 having a light-reflective surface 10a which is stationarily placed on an inspection stage 9. At the upper left of the stage 9 is a screen 11 disposed at a certain angle with respect to the stage 9, onto which a magnified image 12 of a grating is projected by projection means 13.

The projection means 13 comprises a light source 16, means 17 having a grating 17a, and a projection lens 18, thereby to project an image of the grating 17a onto the screen 11. The grating 17a comprises a number of parallel equidistant oblique dark lines of the same width on a transparent plate. The spacing of the lines is previously determined depending on the minimum size of defects such as unevennesses, projections, depressions, scratches and the like to be detected. Along a vertical side of the grating means 12 is a tubular nut 17b threadably engaged with a feed screw 19 which in turn is coupled to a rotatable shaft of a reversible motor 20. As a result of rotation of the motor 20, the grating means 17 is caused to move vertically up or down in accordance with the direction of rotation of the motor 20. There is also a rotary encoder 21 which is coupled to the end of the feed screw 19 to provide a position signal corresponding to a vertical position of the grating 17a to an image processor 22 described later.

On the opposite side of the inspection stage 9 from the screen 11 is detecting means such as a TV camera 14 which picks up the magnified grating image 12 on the screen 11 reflected from the reflective surface 10a of the object 10 and sends corresponding video signals to both the image processor 22 and monitor means 23. The monitor means 23 is, for example, a well-known CRT display device, which can display on its screen the video signals as a pattern of the grating image 12 reflected by the surface 10a of the object 10.

In association with the image processor 22, there is memory means 24 which stores information of a standardized pattern of grating for an acceptable surface configuration. In the image processor 22, the grating pattern, which will be deformed by a defective surface 10a, is compared with the standardized pattern with reference to the position signals to decide whether there are defects on the surface 10a of the object 10. If in fact there is a defect, namely a difference between the grating patterns compared with each other, the image processor 22 provides a defect signal.

In the operation of the surface configuration inspection apparatus, the motor 20 rotates first in one direction and then in the other direction to cause the grating means 17 to move vertically up and then down via the feed screw 19. Therefore, each dark line of the grating 17a is moved by the line interval, to occupy the position previously occupied by an upper dark line adjacent thereto. When picking up the reflection of the magnified grating image 12 from the reflective surface 10a of the object 10, the dark lines of the magnified grating image 12 scan over the whole area of the surface 10a of the object 10. Although in this embodiment the grating means 17 is moved by a distance equal to the interval of the dark lines, nevertheless it is permissible to continuously move the grating means 17 up and down more than that distance.

Figure 2:
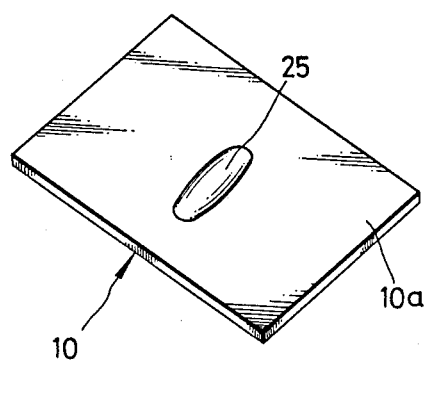
FIG. 2 is a diagram showing the appearance of the defective surface of an object to be inspected by the apparatus according to the present invention.
Figure 3:
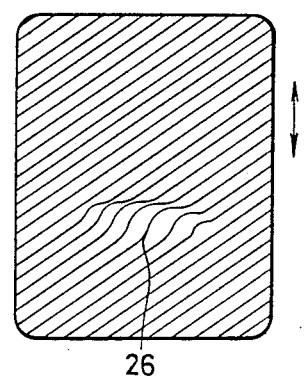
FIG. 3 is an illustration of a CRT screen displaying the pattern of the grating image projected onto the surface of the object of FIG. 2.

As the grating means 17 is moved, the TV camera 14 picks up the reflection of the magnified grating image 12 projected onto the screen 11, via the reflective surface 10a of the object 10. As is shown in FIG. 2, if there is actually a defect, namely a projection 25 on the surface 10a of the object 10, the image of the pattern of the grating is deformed by the defective surface 10a. On the screen of a CRT of the monitor means 23, a deformed pattern 26 is dislayed as is shown in FIG. 3. As the grating means 17 moves up and down, the deformed pattern changes according to the shape of the defect. Accordingly, it is possible to recognize the shape of the defect based on the deformed pattern 26 of grating displayed on the monitor means 23 and the size of the defect based on the change of deformation of the grating pattern displayed on the monitor means 23.

Although the present invention has been fully described by way of the preferred embodiment thereof with reference to the accompanying drawings, it is to be noted that various changes and modifications will be apparent to those skilled in the art. For example, the projection lens 18 may be replaced with a zoom lens which allows varying as desired the distance between the parallel dark lines or the width of the parallel light lines. Therefore, unless otherwise such changes and modifications depart from the true scope of the present invention, they should be construed as included therein.

What is claimed is:

1. A surface configuration inspection apparatus for inspecting a reflective surface of a stationary object on a stage, said apparatus comprising:
   a grating having a number of parallel equidistant dark lines with the same width on a transparent plate;
   means for moving said grating in a plane parallel to said plate;
   means for projecting an image of said grating onto a screen disposed adjacent said stage; and
   means for detecting and displaying a pattern of said grating image projected on said screen as reflected by said reflective surface to be inspected.

2. An apparatus as defined in claim 1, wherein said equidistant dark lines are inclined at an acute angle to the direction in which said grating is moved.

3. An apparatus as defined in claim 1, wherein said detecting and displaying means includes at least image-pick-up means for picking up said reflected image to provide video signals thereof, and monitor means for displaying said video signals as a visual image.

4. An apparatus as defined in claim 3, wherein said image-pick-up means is a TV camera.

5. An apparatus as defined in claim 3, wherein said monitor means is a CRT display device.

6. A surface configuration inspection apparatus for inspecting a reflective surface of a stationary object, said apparatus comprising:
   a grating having a number of parallel equidistant dark lines of the same width on a transparent plate;
   means for projecting an image of said grating onto a screen disposed adjacent said object;
   means for moving said grating in the plane of said plate, said moving means being coupled to means for providing position signals according to the moved positions of said grating;
   means for detecting a pattern of said grating image as reflected by said reflective surface to be inspected to provide video signals of said pattern of said reflected image;
   means for storing information of a standardized pattern of grating which can be retrieved in the form of video signals; and
   means for comparing in the form of video signals said reflected image and said standardized pattern with reference to said position signals to provide a defect signal when there is any difference between said reflected image and said pattern, thereby to indicate said surface of said object to be defected.

7. An apparatus as defined in claim 6, wherein said equidistant dark lines are inclined at an acute angle to the direction in which said grating is moved.

8. An apparatus as defined in claim 6, wherein said detecting means is a TV camera.

* * * * *